JAMES ASH.

Improvement in Tea Kettle Spouts.

No. 123,215.

Patented Jan. 30, 1872.

Witnesses.
Villette Anderson.
F. B. Curtis

Inventor.
James Ash
Chipman & Co.
Attys

UNITED STATES PATENT OFFICE.

JAMES ASH, OF STERLING, ILLINOIS.

IMPROVEMENT IN TEA-KETTLE SPOUTS.

Specification forming part of Letters Patent No. 123,215, dated January 30, 1872.

*To all whom it may concern:*

Be it known that I, JAMES ASH, of Sterling, in the county of Whiteside and State of Illinois, have invented a new and valuable Improvement in Tea-Kettle Spouts; and I do hereby declare that the following is a full, clear, and exact description of the construction and operation of the same, reference being had to the annexed drawing making a part of this specification, and to the letters and figures of reference marked thereon.

Figure 1:
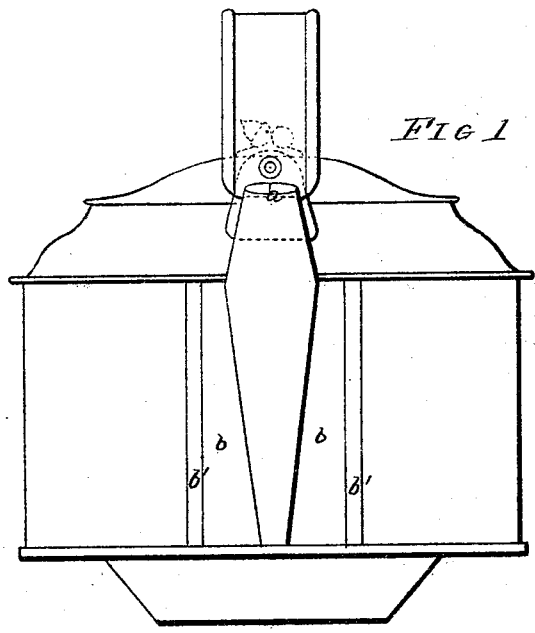
Figure 2:
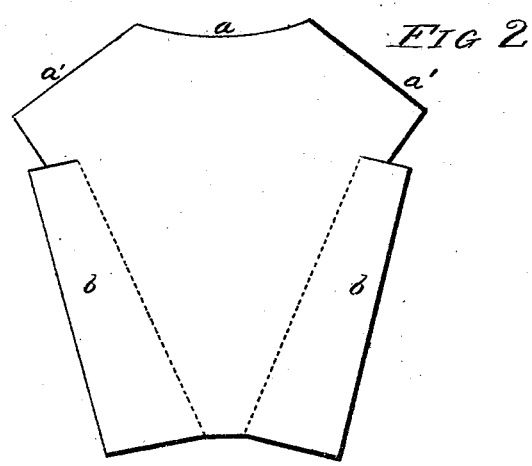
Figure 3:
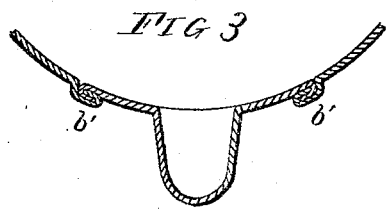

Figure 1 of the drawing is a representation of a tea-kettle having my improved spout attached. Fig. 2 is a front view of a tin plate shaped to form spout. Fig. 3 is a horizontal section of a spout attached to a kettle.

This invention has relation to tea-kettles; and the novelty consists in making the spout of one piece of tin, with a single seam, and uniting it with the body of the kettle by overlap seams at a distance from the angle, so that the spout shall be as strong as the rest of the kettle.

To form this spout I first cut a plate of tin to the shape shown in Fig. 2, and afterward bend it into the required form to make a spout. The curved side $a$ constitutes the edge of the mouth of the spout. The edges $a'$ are brought together and soldered to form the seam, which extends along the back of the spout from its mouth to the top part of the kettle. The sides or wings $b$ are then bent so as to correspond to the circumference of the kettle. The ends of the strip or plate from which the body or cylindrical part of the kettle is formed are separated in making the kettle so as to leave a space to be filled by the spout and the wings $b$. The wings are united to the body of the kettle by forming overlap-seams $b'$ and soldering them. The upper and lower edges of the plate from which the spout is formed are fitted and soldered to the top and bottom of the kettle in the same manner as the rest of the kettle-body.

The plate of tin from which the spout is constructed need not be of the exact form shown in the drawing.

The different curves and angles may be formed and the superfluous metal trimmed off afterward.

The spout constructed and arranged as described is as strong as, or even stronger than, the other parts of the kettle, and is believed to be better and more easily made than spouts which are soldered to the kettle at their angular junction. There is no danger of the spout breaking off, being stronger at the angles formed by the wings than at any other point.

What I claim as my invention, and desire to secure by Letters Patent, is—

A sheet-metal kettle having its spout provided with wings $b$ bent outward from the angle, and secured to the body by seams along the outer edge of the wings, as specified.

In testimony that I claim the above I have hereunto subscribed my name in the presence of two witnesses.

JAMES ASH.

Witnesses:
WM. L. PATTERSON,
GEO. M. ROBINSON.